May 26, 1970 C. T. RAE 3,514,543

BATTERY INSERTION APPARATUS FOR EXTENDING LOOP TELEPHONE LINES

Filed March 29, 1968

INVENTOR

COLIN T. RAE

BY

Mason, Fenwick & Lawrence

ATTORNEYS

United States Patent Office 3,514,543
Patented May 26, 1970

3,514,543

BATTERY INSERTION APPARATUS FOR EXTENDING LOOP TELEPHONE LINES

Colin T. Rae, Vienna, Va., assignor, by mesne assignments, to Harvey Hubbell, Incorporated, Bridgeport, Conn., a corporation of Connecticut Filed Mar. 29, 1968, Ser. No. 717,354
Int. Cl. H04b 3/00
U.S. Cl. 179—16 7 Claims

ABSTRACT OF THE DISCLOSURE

Booster battery insertion apparatus for extending the useful range of central office equipment serving long loop telephone subscriber lines, including a battery powered inverter circuit for applying equal and isolated booster voltages to the tip and ring lines and a polarity detector for reversing the polarity of such booster voltages when the polarity of the central office equipment battery is reversed.

BACKGROUND AND OBJECTS OF THE INVENTION

It is sometimes desirable to extend the useful range of central office equipment associated with long loop subscriber telephone lines by adding a battery in series with the line to increase the effective central office battery voltage. This, however, is not a mere matter of adding an additional battery in series with the line, because there are a number of circumstances in which the polarity of the line must be reversed. For example, when dialing the operator on a No. 5 Cross Bar Office, the line is reversed when the operator's trunk is connected to the calling party and returns to normal polarity when the operator answers. In some cases in step-by-step central offices, battery reversal is encountered when the called party answers the phone by going off-hook. In multi-party ringing systems, the battery polarity is sometimes used along with selection of side of the line ringing to select a given party and, therefore, the polarity must follow the central office polarity for correct operation.

An object of the present invention, therefore, is the provision of novel apparatus forming a battery insertion loop extender for use on long loop subscriber telephone lines to raise the effective central office battery potential and which provides for reversing the inserted battery whenever the central office battery is reversed.

Yet another object of the present invention is the provision of a booster battery type of loop extender for extending the useful range of central office equipment on long loop subscriber telephone lines which reverses the inserted battery whenever the central office battery is reversed and preserves the line balance.

Other objects, advantages and capabilities of the present invention will become apparent from the following detailed description taken in conjunction with the accompanying drawing illustrating a preferred embodiment of the invention.

DETAILED DESCRIPTION OF THE INVENTION

Figure 1:
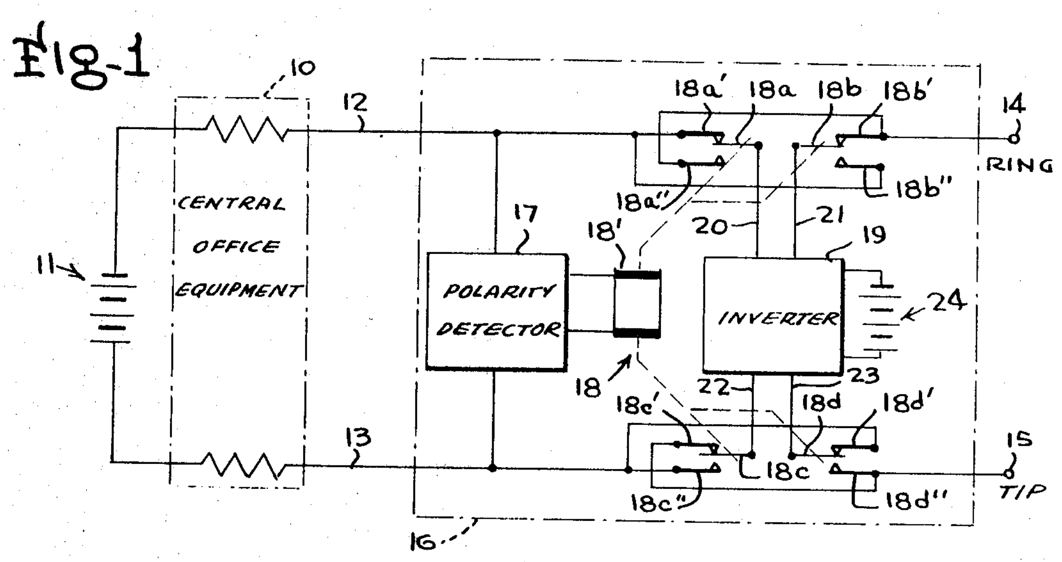
FIG. 1 is a simplified block-type diagram illustrating the battery insertion loop extender apparatus of the present invention.

Referring to FIG. 1, there is indicated in diagrammatic form the central office equipment 10, having a battery 11 associated therewith, for example a 48-volt battery, for providing a normal 48-volt potential across the ring outlet line 12 and tip outlet line 13 from the central office equipment 10. Interposed between the ring and tip outlet lines 12, 13 and the ring and tip lines of the subscriber loop served thereby, indicated by terminals 14 and 15, is the battery insertion loop extender of the present invention, indicated generally by the reference character 16.

This loop extender 16 includes a polarity detector, generally indicated at 17, connected across the ring and tip outlet lines 12, 13, having a relay 18 whose coil 18' is energized and de-energized in a selected manner to control movable relay contact arms **18*a* and 18*b* associated with the ring line and movable contact arms 18*c* and 18*d* associated with the tip line. Normally closed stationary contact 18*a*' and normally open stationary contact 18*b*'' are both connected to the ring outlet line 12, while normally open station contact 18*a*'' and normally closed stationary closed contact 18*b*' are both connected to the ring terminal 14. Similarly, normally closed stationary contact 18*c*' and normally open stationary contact 18*d*'' are both connected to the tip outlet line 13 and normally open stationary contact 18*c*'' and normally closed stationary contact 18*d*' are both connected to the tip terminal 15**.

An inverter 19 has leads 20, 21 respectively connected to the movable contact arms **18*a*, 18*b* and leads 22, 23 respectively connected to the movable contact arms 18*c* and 18*d*. A 48-volt battery 24 forms the battery supply for the inverter 19. The inverter 19 uses the battery to supply its operating power and supplies two independent output voltages which are used for the boost voltage. It has a slide type selector switch which may be set in either a 48-volt booster position or a 24-volt booster position, this voltage being split into two 12-volt outputs, for the 24-volt booster position, or two 24-volt outputs for the 48-volt booster position, which are then applied in series with the line to maintain line balance. When the central office battery 11 is reversed for supervisory reasons, the polarity detector 17 detects the change. This energizes relay 18, which is connected as a reversing switch by the contact connections previously described, and reverses the polarity of the battery 24 to keep it in the proper polarity to be in series aiding relation to the central office equipment battery 11**.

Figure 2:
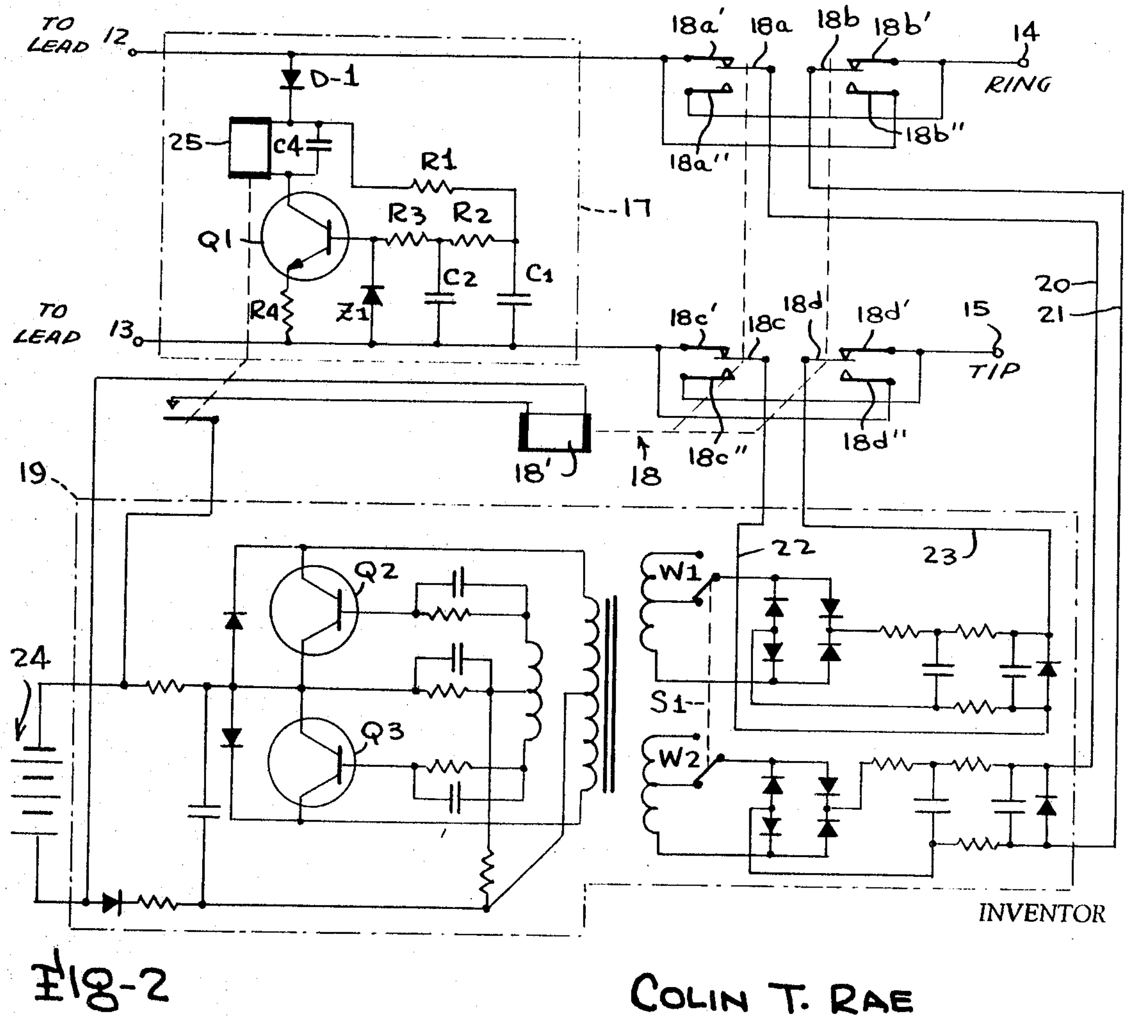
FIG. 2 is a schematic diagram of the battery insertion loop extender apparatus.

A full schematic diagram of the loop extender 16 is shown in FIG. 2. It will be noted from FIG. 2 that the inverter 19 is a standard push-pull, two transistor unit having transistors Q2 and Q3, with a split secondary indicated by windings W1 and W2 and an associated selector switch S1 to supply two sources of voltage. The switch S1 in FIG. 2 is shown in the 24-volt boost position, supplying 12 volts to each of the sets of lines 20, 21 and 22, 23. In the upper position, the switch S1 provides two supplies of 24 volts to each of these sets of lines. Intervening between the winding W1, W2 and the associated sets of lines 20, 21 and 22, 23 are conventional diode rectifier networks and filtering networks.

The polarity detector 17, as shown in FIG. 2, consists of a diode D1, a low pass filter consisting of R1, C1, R2, C2, and R3, a constant current supply consisting of Zener diode Z1, transistor Q1, and resistor R4, and a relay 25 in addition to the relay 18. In the normal condition of the line, the ring side is negative, diode D1 is reverse biased, and no change occurs in the reversing relay 18. When the central office battery is reversed, however, diode D1 is forward biased and current flows through the low pass filter to the base of transistor Q1, turning it on. This energizes relay 25, which in turn energizes relay 18 and reverses the inverter output. The low pass filter serves a very important function of filtering off the ringing signals to keep the relays from chattering during ringing, this being further accomplished by slugging the relay 25 with the capacitor C4.

It will be apparent that this battery insertion type loop extender provides a convenient facility for raising the central office battery potential to either 72 volts or 96 volts, as selected by operation of the internal selector switch S1. Line balance is preserved by inserting the boost voltage generated by the inverter 19 in series with both the ring and tip lines. By reason of the automatic line reversal effected by the polarity detector 17, the polarity properly follows the central office polarity for correct operation, thus permitting use of the loop extender on coil lines and any lines requiring battery reversal.

While but one particular embodiment of the present invention has been specifically shown and described, it will be apparent that various modifications may be made therein within the spirit and scope of the invention, and it is deseired, therefore, that only such limitations be placed thereon as are imposed by the prior art and set forth in the appended claims.

What is claimed is:

1. Booster voltage insertion apparatus for extending the useful range of central office equipment associated with long loop telephone subscriber lines, comprising polarity detector means connected across the ring and tip lines at the central office equipment and including a reversing relay having two sets of contacts operated responsive to the polarity of central office battery voltage applied to said ring and tip lines to assume first and second positions, booster voltage means including a battery powered booster voltage generating means for applying selected voltages to said sets of relay contacts, said two sets of relay contacts being respectively associated with the ring and tip lines and each including a movable contact arm coupled to said booster voltage means and stationary contacts associated with each of the respective movable contact arms and connected in the respective ring and tip lines to connect said booster voltage means in a first polarity in series with said lines in series aiding relation to the central office equipment battery at said first position and in an opposite polarity at said second position whereby the connections of the booster voltage means with the lines are automatically maintained in series aiding relation to the central office equipment battery upon reversal of polarity of the latter.

2. Booster voltage insertion apparatus as defined in claim 1, wherein said booster voltage generating means includes means for isolating the voltage supplied thereby into two equal and isolated voltage sources which are respectively applied to the movable contact arms of said two sets of relay contacts to maintain line balance between said ring and tip lines.

3. Booster voltage insertion apparatus as defined in claim 2, wherein said booster voltage generating means comprises a supply battery and an inverter for isolating the supply battery from the central office battery and from ground.

4. Booster voltage insertion apparatus as defined in claim 2, wherein said booster voltage generating means comprises a supply battery and switch means having a first position for providing said two voltage sources at a first selected voltage level which is a fraction of the rated voltage of said supply battery and a second position for supplying said two voltage sources at a second higher voltage level.

5. Booster voltage insertion apparatus as defined in claim 1, wherein said polarity detector means comprises a second relay having contacts controlling the supply to the coil of said reversing relay, a diode and transistor means intercoupled with the coil of said second relay across said ring and tip lines, said diode being forward and reverse biased responsive to the polarities of said ring and tip lines to control conduction through said transistor means and the coil of said second relay so as to regulate said reversing relay to always maintain the booster voltage applied to said lines in series aiding relation to the central office equipment battery.

6. Booster voltage insertion apparatus as defined in claim 5, wherein said polarity detector means includes low pass filter means coupled with said diode across said ring and tip lines and controlling conduction through said transistor means to filter off any ringing signals applied to said lines and avoid chattering of said second relay during ringing.

7. Booster voltage insertion apparatus as defined in claim 2, wherein said polarity detector means comprises a second relay having contacts controlling the supply to the coil of said reversing relay, a diode and transistor means intercoupled with the coil of said second relay across said ring and tip lines, said diode being forward and reverse biased responsive to the polarities of said ring and tip lines to control conduction through said transistor means and the coil of said second relay so as to regulate said reversing relay to always maintain the booster voltage applied to said lines in series aiding relation to the central office equipment battery.

References Cited

UNITED STATES PATENTS 2,055,647 9/1936 Bowne -------------- 179—27

KATHLEEN H. CLAFFY, Primary Examiner

R. P. MYERS, Assistant Examiner